United States Patent [19]

Beatty

[11] Patent Number: 5,282,722
[45] Date of Patent: Feb. 1, 1994

[54] ELECTRONIC PRESSURE CONTROL

[75] Inventor: James M. Beatty, Minnetonka, Minn.

[73] Assignee: Wagner Spray Tech Corporation, Minneapolis, Minn.

[21] Appl. No.: 25,876

[22] Filed: Mar. 3, 1993

Related U.S. Application Data

[63] Continuation of Ser. No. 713,814, Jun. 12, 1991, abandoned.

[51] Int. Cl.$^5$ .............................................. F04B 49/08
[52] U.S. Cl. ...................................... 417/15; 417/38; 417/44 A; 417/44 H
[58] Field of Search ............... 417/15, 38, 44 A, 44 H

[56] References Cited

U.S. PATENT DOCUMENTS

| | | | |
|---|---|---|---|
| 1,245,200 | 11/1917 | Davis | 417/44 |
| 4,212,591 | 7/1980 | Lamontagne et al. | 417/38 |
| 5,096,392 | 3/1992 | Griebel et al. | 417/38 |

Primary Examiner—Richard A. Bertsch
Assistant Examiner—David W. Scheuermann
Attorney, Agent, or Firm—Faegre & Benson

[57] ABSTRACT

A pressure control loop apparatus for controlling the operation of an electromagnetic clutch in portable spray painting equipment powered by an internal combustion engine having a pressure transducer for sensing the pressure, a manually adjustable pressure reference, a comparator type error detector, and a pressure deadband control for inserting a deadband in the pressure control loop with the deadband varying as the pressure reference varies.

6 Claims, 6 Drawing Sheets

Fig. 4

| CONTROL LOOP CONDITION 22 | JUMPER POSITION 236 | COMPARATOR OUTPUT STATE | | | | CLUTCH DRIVER TRANSISTORS | | CLUTCH CONDITION 32 |
|---|---|---|---|---|---|---|---|---|
| | | 186 | 196 | 200 | 206 | 219 | 222 | |
| $P_{REF} > P_{ACTUAL}$ | IN | LOW | OPEN | LOW | OPEN | OFF | ON | ON |
| $P_{REF} \leq P_{ACTUAL}$ | IN | HIGH | LOW | HIGH | OPEN | ON | OFF | OFF |
| $P_{REF} < P_{ACTUAL} < P_{REF} - DEADBAND$ | IN | HOLD PRIOR STATE | HOLD PRIOR STATE | HOLD PRIOR STATE | OPEN | HOLD PRIOR STATE | HOLD PRIOR STATE | HOLD PRIOR STATE |
| X | OUT | X | X | X | LOW | X | OFF | OFF |

238 ← table label

240 — 242 — 244 — 246 — 248

ELECTRONIC PRESSURE CONTROL

This is a continuation of U.S. patent application Ser. No. 07/713,814, filed Jun. 12, 1991, now abandoned.

BACKGROUND OF THE INVENTION

This invention relates to electronic controls for operating piston pumps, particularly for pumping paint in spray painting systems, in systems wherein the piston pump is driven by an internal combustion engine.

BRIEF DESCRIPTION OF THE DRAWINGS

FIG. 3 is a key for FIGS. 3a and 3b.

FIG. 4 is a chart illustrating the operation of the present invention.

DETAILED DESCRIPTION

Figure 1:
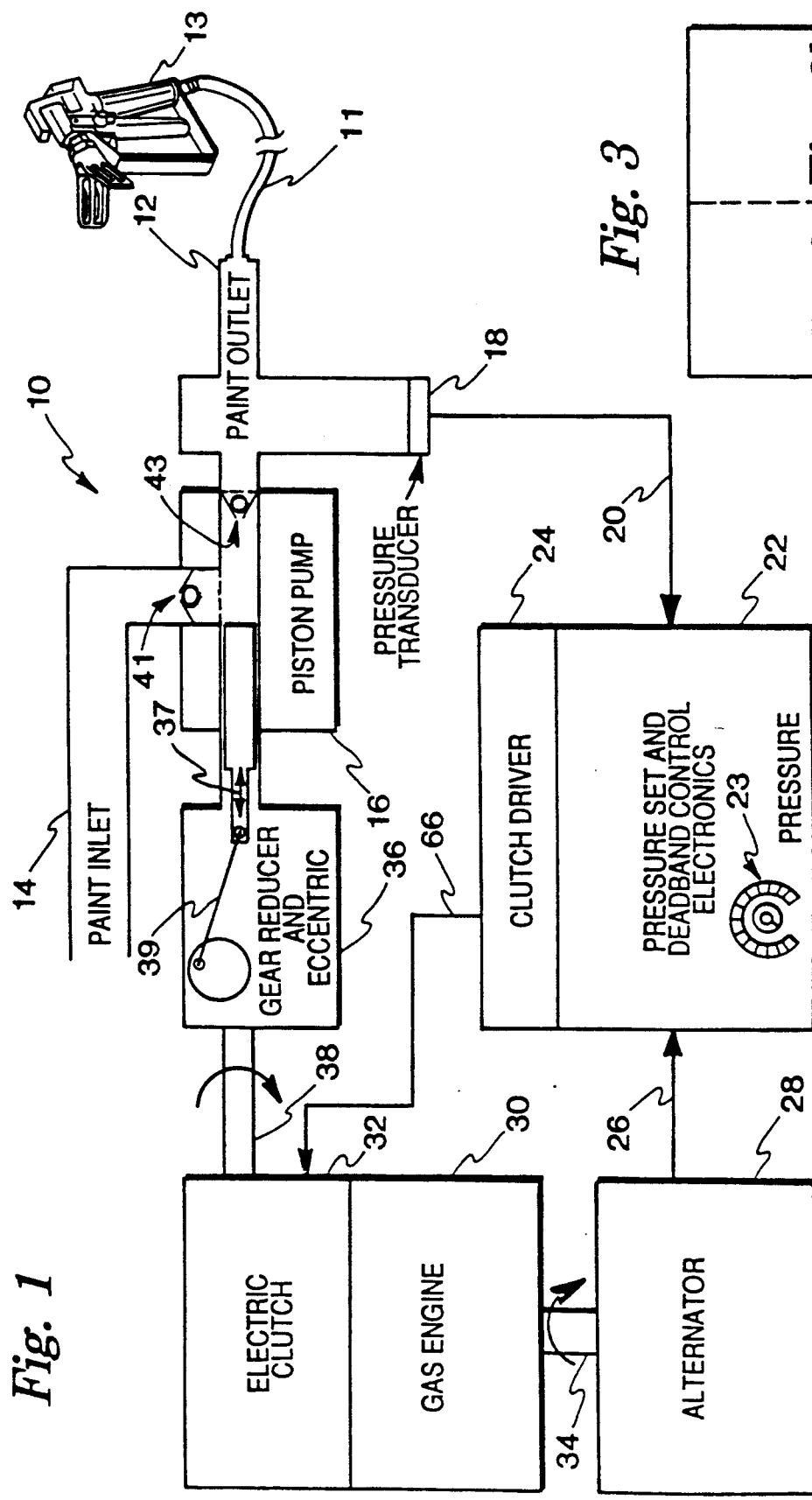
FIG. 1 shows a block diagram of the overall control system of the present invention.

Referring now to FIG. 1, the present invention relates to a portable painting system 10 for providing pressurized paint at a paint outlet 12 which is to be understood to be connected via a hose or high pressure tubing 11 to a paint spray gun 13. Paint is supplied from a container (not shown) to a paint inlet 14 such as by way of a conventional syphon or suction tube. The paint is pressurized by a piston pump 16 and the outlet pressure of pump 16 is transduced by a pressure transducer 18 to provide an electrical signal 20 representative of actual pressure. Signal 20 is provided to a pressure set and deadband control electronics subsystem 22 which controls a clutch driver 24. A knob or control 23 is available to an operator to set the desired pressure for the system 10. Power for electronics 22 is provided via line 26 from an alternator 28 driven from an internal combustion engine 30. Engine 30 preferably drives an electric clutch 32 which is electrically controllable via line 66 between ON and OFF conditions by clutch driver 24.

It is to be understood that shaft 34 rotates continuously with engine 30, while shaft 38 is selectively rotatable depending upon the state of electric clutch 32. A gear reducer and eccentric drive 36 includes means for converting the rotary motion of shaft 38 to reciprocating motion 37 to actuate the piston in pump 16 by any of a number of conventional means, such as an eccentrically mounted crank arm 39. It is further to be understood that piston pump 16 preferably has inlet and outlet check valves 41, 43 to maintain the pressure in paint outlet 12.

Figure 2:
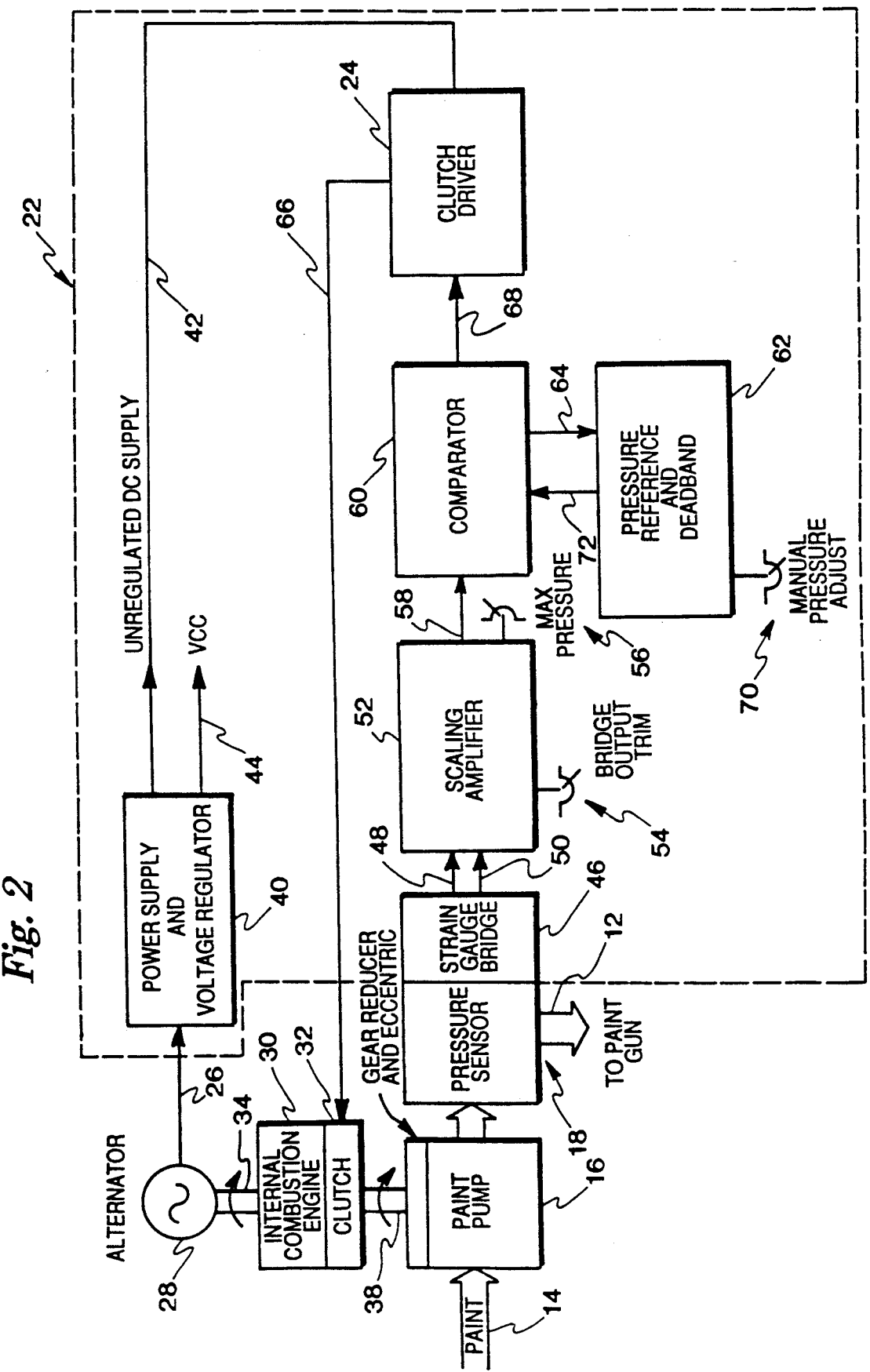
FIG. 2 shows a more detailed block diagram of the control system of the present invention.

Referring now also to FIG. 2, it may be seen that electronics subsystem 22 preferably has a power supply and voltage regulator 40 providing an unregulated DC supply 42 to clutch driver 24 and also provides a regulated VCC supply 44. Pressure transducer or sensor 18 includes a strain gauge bridge 46 which provides a differential output on lines 48, 50 to a scaling amplifier 52. Amplifier 52 has a bridge output trim adjustment 54 and a max pressure adjustment 56; amplifier subsystem 52 provides an output 58 to a comparator subsystem 60. Comparator subsystem 60 communicates with a pressure reference and deadband subsystem 62 via lines 64, 72 and provides an output 68 to the clutch driver 24. An external manual pressure adjustment 70 is available for adjustment by an operator of system 10 to set the desired pressure of the paint to be supplied to the paint gun at outlet 12. It is to be understood that adjustment 70 is mechanically coupled to knob or control 23.

The electronics subsystem or pressure control loop apparatus 22 controlling the operation of the electromagnetic clutch 32 in the drive train between internal combustion engine 30 and piston pump 16 regulates the output pressure of the pump 16 at outlet 12. Apparatus 22 includes pressure transducer 18 coupled to the output 12 of pump 16. Transducer 18 has an output pressure signal present on lines 48, 50 (which together make up the actual pressure signal 20) representative of the output pressure of pump 16. Apparatus 22 also includes a pressure reference means 70 which is adjustable via control or knob 23 for adjusting the set point or desired pressure signal on line 72. Apparatus 22 also includes comparator subsystem 60 for comparing the desired pressure signal 72 and the scaled output pressure signal on line 58 and has means for providing a signal on line 68 to energize clutch 32 when the output or actual pressure signal 58 is less than the desired pressure signal 72. Apparatus 22 also includes the pressure reference and deadband control subsystem or pressure deadband control means 62 which inserts a pressure deadband in the pressure control loop 22. The deadband extends from an upper level at which the clutch is turned OFF to a lower level at which the clutch is turned ON. Deadband control 62 shifts the desired pressure signal on line 72 from a higher level to a lower level at the moment when the clutch is turned OFF and from the lower level to the higher level at the moment when the clutch is turned ON. The desired pressure signal is preferably shifted by a voltage level shifter in the deadband control 62 connected to shift the voltage on line 72. It is to be understood that the desired pressure signal originates with the manual pressure adjust means 70 and is modified by the deadband control 62 to provide a modified desired pressure signal on line 72, depending on the state of the comparator subsystem 60 (as indicated by the signal on line 64). It is to be further understood that the state of comparator subsystem 60 corresponds to the state of clutch driver 24 and clutch 32.

Figure 3A:
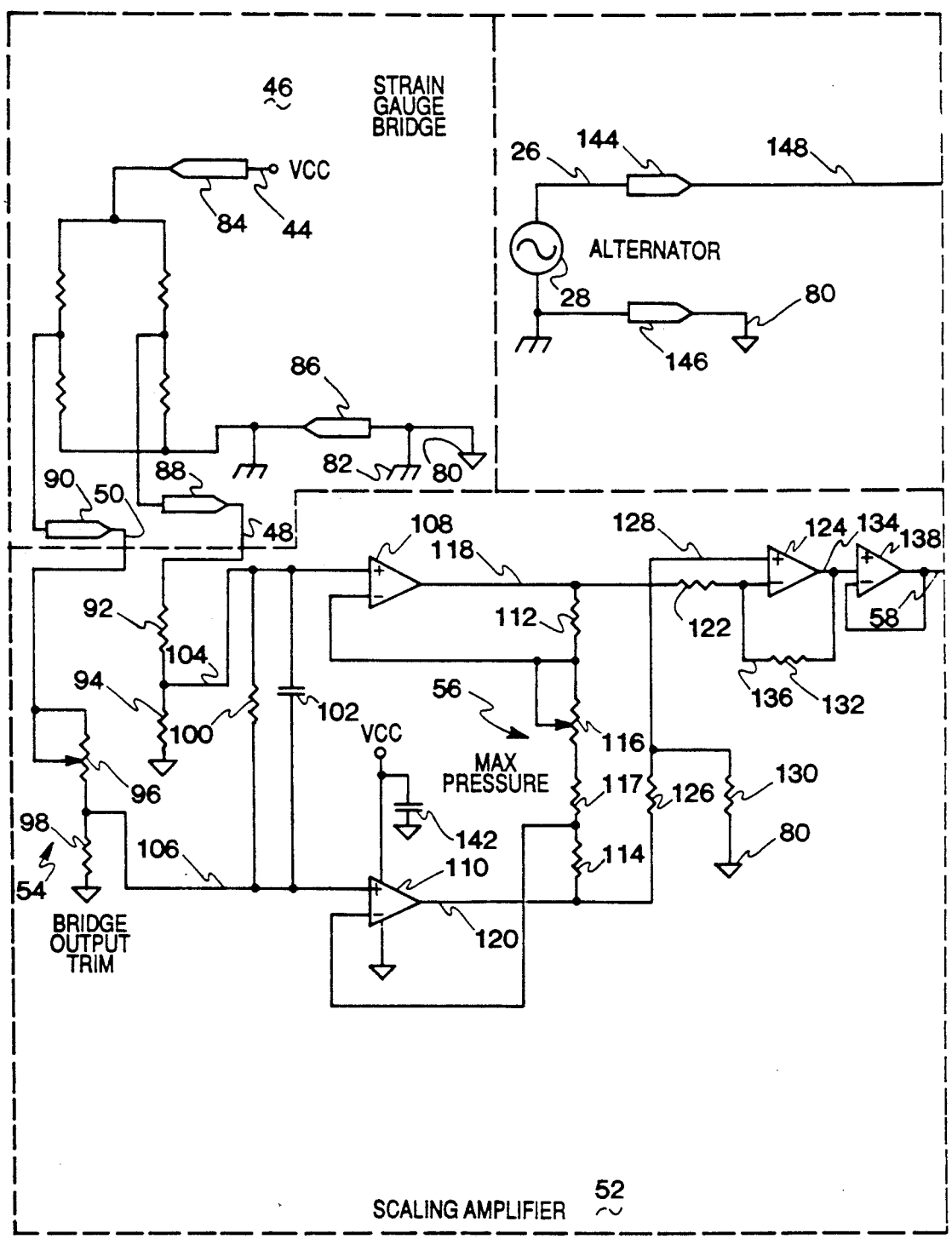
FIGS. 3a and 3b together make up a detailed electrical schematic of the electronic control of the present invention.
Figure 3B:
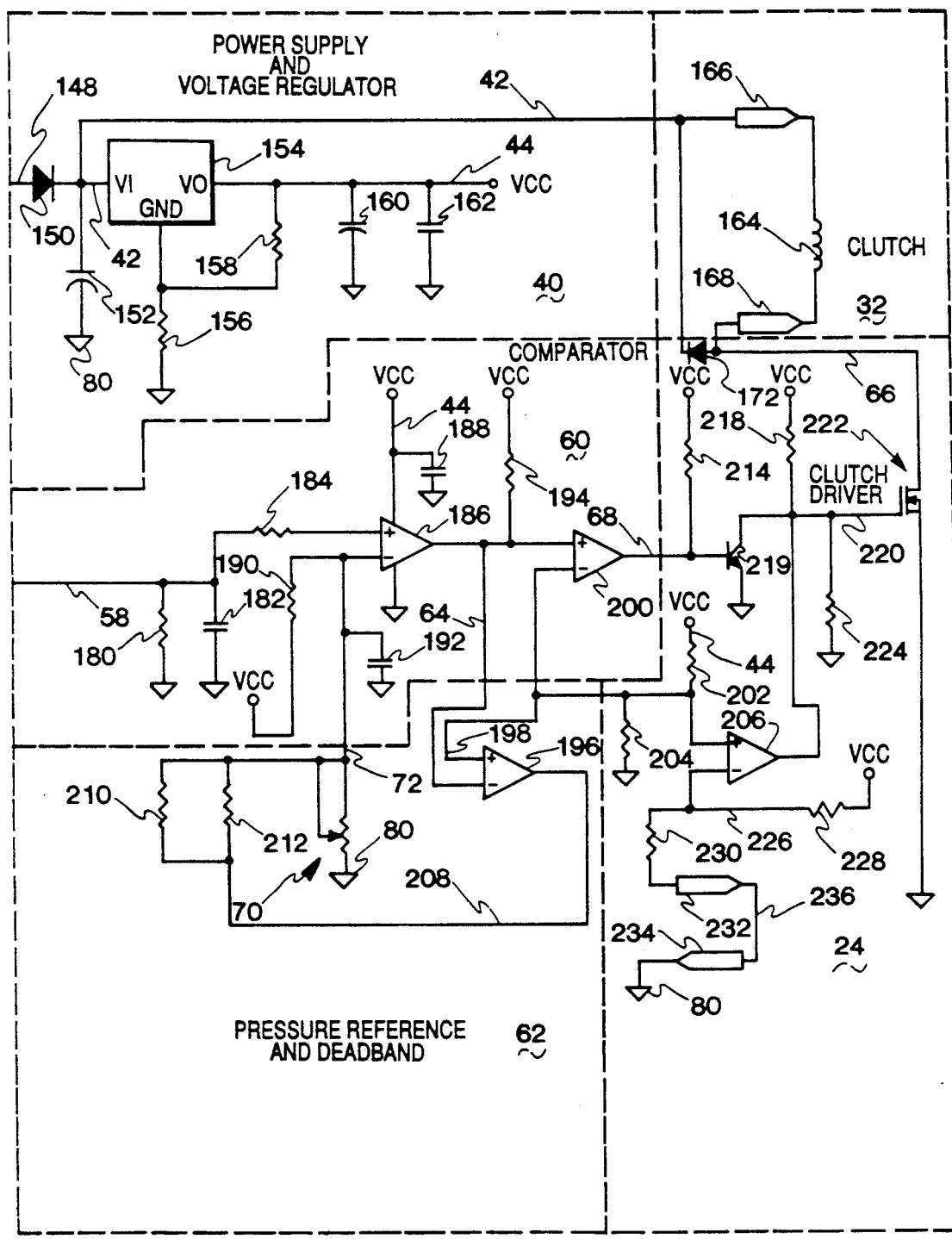

Referring now to FIGS. 3a and 3b, details of the electrical schematic of the pressure control loop may be seen.

Strain gauge bridge 46 preferably utilizes a model PT10 pressure diaphragm as manufactured by Revere Corp. of America, 845 North Colony Road, Wallingford, Conn. 06492. Bridge 46 is preferably connected between VCC 44 and circuit common 80. Circuit common 80 is also connected to chassis ground 82. Strain gauge bridge 46 is preferably connected through a cable having detachable connectors 84, 86, 88, 90. It is to be understood the power is supplied to the bridge via connectors 84, 86 and the output of the bridge is supplied through connectors 88, 90 via lines 48, 50 to the scaling amplifier 52. Line 48 is connected to a voltage divider made up of a 499 ohm resistor 92 and a 200K resistor 94. Line 50 is connected to a 1K potentiometer 96 connected in a rheostat configuration which, together with a 200K resistor 98 forms another voltage divider. A 10K resistor 100 and a 120 pf capacitor 102 are connected across the output lines 104, 106 of the bridge output voltage dividers. Each of lines 104, 106 is connected to the non-inverting input of respective operational amplifiers (or "op amps") 108, 110 which are wired in a differential amplifier configuration utilizing a pair of 200K resistors 112, 114 and a 500 ohm rheostat-connected potentiometer 116. A 1K resistor 117 is is also connected in series between potentiometer 116 and resistor 114. Output 118 of op amp 108 is connected through a 360K resistor 122 to the inverting input of op amp 124 and output 120 of op amp 110 is connected through a 360K resistor 126 to the non-inverting input 128 of op amp 124. A 360K resistor 130 is connected from input 128 to circuit common 80. A 360K resistor 132 is connected between output 134 and the inverting input 136 of op amp 124. Output 134 is connected to the non-inverting input of another op amp 138, connected in a non-inverting, unity-gain configuration and having an output on line 58. It is to be understood that op amps 108, 110, 124, and 138 are preferably formed from a quad op amp integrated circuit (IC) type LM324AN as available from National Semiconductor. A 0.1 mf capacitor 142 is preferably connected to the power supply terminal of the op amp IC for noise protection.

Alternator 28 is also preferably connected to subsystem 22 through a cable having a detachable pair of connectors 144, 146. Connector 146 connects the low side of alternator 28 to circuit common 80 and connector 144 provides a single-ended output from alternator 28 on line 148.

Referring now more particularly to FIG. 3b, the alternator output on line 148 is provided to the power supply and voltage regulator subsystem 40 and is rectified by diode 150 and filtered by a 4700 mf capacitor 152 before being supplied on line 42 to an integrated circuit voltage regulator 154 which may be a type LM317LZ as available from National Semiconductor. Voltage regulator 154 is connected with a 2.4K resistor 156 and a 360 ohm resistor 158. The output of regulator 154 is preferably 8.6 volts on the VCC line 44. A 100 mf capacitor 160 and a 0.1 mf capacitor 162 provide filtering for the regulated DC supply 44. The unregulated DC supply line 42 is also provided to clutch driver 24 and clutch winding 164 of clutch 32 through connector 166. A second connector 168 completes the electrical circuit from clutch winding 164 to line 66 in clutch driver 24. A diode 172 is connected across clutch winding 164 at lines 42, 66.

The scaled output of the pressure feedback signal on line 58 is supplied to comparator subsystem 60. Line 58 is connected to a 10K resistor 180, a 0.1 mf capacitor 182, and a 100 ohm resistor 184. Resistor 184 is connected to the non-inverting input of a comparator 186, having a 0.1 mf noise suppression capacitor 188 connected to its positive supply terminal which is also connected to VCC 44. The inverting input 72 of comparator 186 is connected to a 5.6K resistor 190 and a 0.1 mf capacitor 192 in addition to the external manual pressure adjustment means or potentiometer 70 connected in a rheostat configuration between line 72 and circuit common 80. Output 64 of comparator 186 has a 10K pull-up resistor 194 connected to VCC 44 and is further connected to the inverting input of a deadband comparator 196. Line 198 is connected to the non-inverting input of comparator 196 and the inverting input of an output comparator 200 and is also connected to a voltage divider connected across VCC 44 made up of a pair of 10K resistors 202, 204. The output 198 of the resistive voltage divider made up of resistors 202 and 204 is also connected to the non-inverting input of a lock-out comparator 206. Deadband comparator 196 has an output 208 connected to a 20K resistor 210 and a 30K resistor 212 connected in parallel with each other and to the pressure reference command line 72. Output line 68 of comparator 200 has a 10K pull-up resistor 214 connected to VCC 44 and is also connected to the base of a type 2N2222 transistor 219. Transistor 219 has a 510 ohm collector resistor 218 and is connected to the gate 220 of a type IRF522 FET transistor available from International Rectifier. A 51K pull-down resistor 224 is also connected to gate 220.

Comparator 206 has its inverting input 226 connected between a 10K resistor 228 and a 100 ohm resistor 230. Resistor 230 is connected through connectors 232 and 234 via a jumper 236 to circuit common 80. It is to be understood that jumper 236 is in the cable and connector assembly coupling strain gauge bridge 46 to the scaling amplifier 52 such that when then strain gauge 46 is disconnected from scaling amplifier 52, jumper 236 is removed via connectors 232, 234, opening the circuit between resistor 230 and circuit common 80.

It is to be understood that comparators 186, 196, 200 and 206 are preferably formed of a quad comparator integrated circuit available from National Semiconductor as a type LM339N. This type of comparator has an open-collector type output.

Referring now also to FIG. 4, the adjustment and operation of the circuit is as follows. With the system 10 OFF (i.e., at zero pressure) the maximum Pressure adjustment 56 is set for minimum gain in scaling amplifier 52. The Bridge Output Trim adjustment 54 is then set to obtain 200 mV on line 58. System 10 is then started and the maximum Pressure adjustment 56 is preferably adjusted to provide 5 volts output at line 58 at the maximum operating pressure when the manual Pressure adjustment 70 is at its highest setting. The manual Pressure adjustment control 23 and potentiometer 70 is subsequently available for an operator to select the operating pressure of control loop 22, which may, for example, be between 500 and 2800 psi at outlet 12.

It is to be understood that there is an OFF threshold at the low pressure end of the manual Pressure adjustment potentiometer 70 provided by the 200 mV output from the scaling amplifier 52 at zero pressure. Providing such a biased scaling amplifier output at zero pressure forces the clutch driver to remain OFF when an operator calls for zero pressure through adjustment 70.

To operate system 10 the gas engine 30 is started and a variable pressure set point is manually selected by the operator by adjusting control 23 which is mechanically coupled to the Pressure adjustment means 70. This results in a pressure reference signal adjustment on line 72. If the actual pressure at outlet 12 is below the level set by the signal on lead 72, comparator subsystem 60 will command clutch driver 24 and clutch 32 to turn ON, increasing the actual pressure. Piston pump 16 is then reciprocated until pressure transducer 18 indicates that the pressure at paint outlet 12 has reached the set point. Once the set point is reached, the comparator subsystem 60 commands the clutch driver 24 and clutch 32 to turn OFF. Deadband comparator 196 will then change state, automatically lowering the signal on lead 72 by the amount of the deadband, and the control loop 22 will remain satisfied, holding clutch driver 24 and clutch 32 OFF until the actual pressure falls below the original level of the reference pressure by the amount of the deadband. The deadband provides system stability in the face of pulsing output caused by pump 16 being a piston pump with its characteristic reciprocating pressure output. It is to be understood that the hose 11 connected to the paint outlet 12 is sufficiently long and resilient to act as an accumulator or reservoir, damping pulsations or oscillations in the actual pressure. In the event that the strain gauge bridge 46 is disconnected from the scaling amplifier 52, jumper 236 opens the voltage divider circuit at the inverting input 226 of lock-out comparator 206, causing the comparator 206 to go to a low, forcing a low output state on line 220 "locking-out" further operation of the clutch 32, thus holding the clutch OFF in the absence of pressure feedback. Reconnecting the strain gauge connector will also reconnect jumper 236, resetting comparator 206 to an open output condition, thus enabling clutch driver 24 to respond to appropriate ON and OFF commands on line 68 when pressure feedback is provided by the pressure transducer 18.

In FIG. 4 chart 238 illustrates various aspects of the operation of the present invention. Row 240 indicates the reference numerals in the previous figures to which the subsequent conditions pertain. Row 242 indicates that operation of the present invention when the reference pressure, $P_{REF}$, is greater than the actual pressure $P_{ACTUAL}$. In this condition of control loop 22, (with jumper 236 in the circuit) the output of comparator 186 is low, comparator 196 has an open collector output condition, comparator 200 has a low output condition and comparator 206 has an open output condition. At this time clutch driver transistor 219 is OFF and the output FET transistor 222 is ON, turning on clutch 32 causing pump 16 to operate and build the actual pressure.

Referring now to row 244, once the actual pressure equals or exceeds the reference pressure, comparators 186, 196 and 200 change states, along with the clutch driver transistors, turning the clutch OFF. When the control loop passes through the deadband as indicated in row 246, the comparator state outputs remain in their previous state, as do the clutch driver transistors and the clutch itself. Thus if the clutch was ON when the control loop entered the deadband, it will remain ON in the deadband, and if the control loop entered the deadband from the clutch OFF condition, the clutch will remain OFF in the deadband.

Row 248 illustrates the circumstance when the strain gauge or pressure sensor cable is disconnected, opening the circuit by disconnecting jumper 236. At this time the output of comparator 206 is driven to a low condition holding transistor 222 OFF, thus keeping clutch 32 OFF. The condition of control loop 22 in general, and the output states of comparators 186, 196 and 200 in particular are "don't-care" conditions in this circumstance since the open jumper overrides the pressure control loop.

Figure 5:
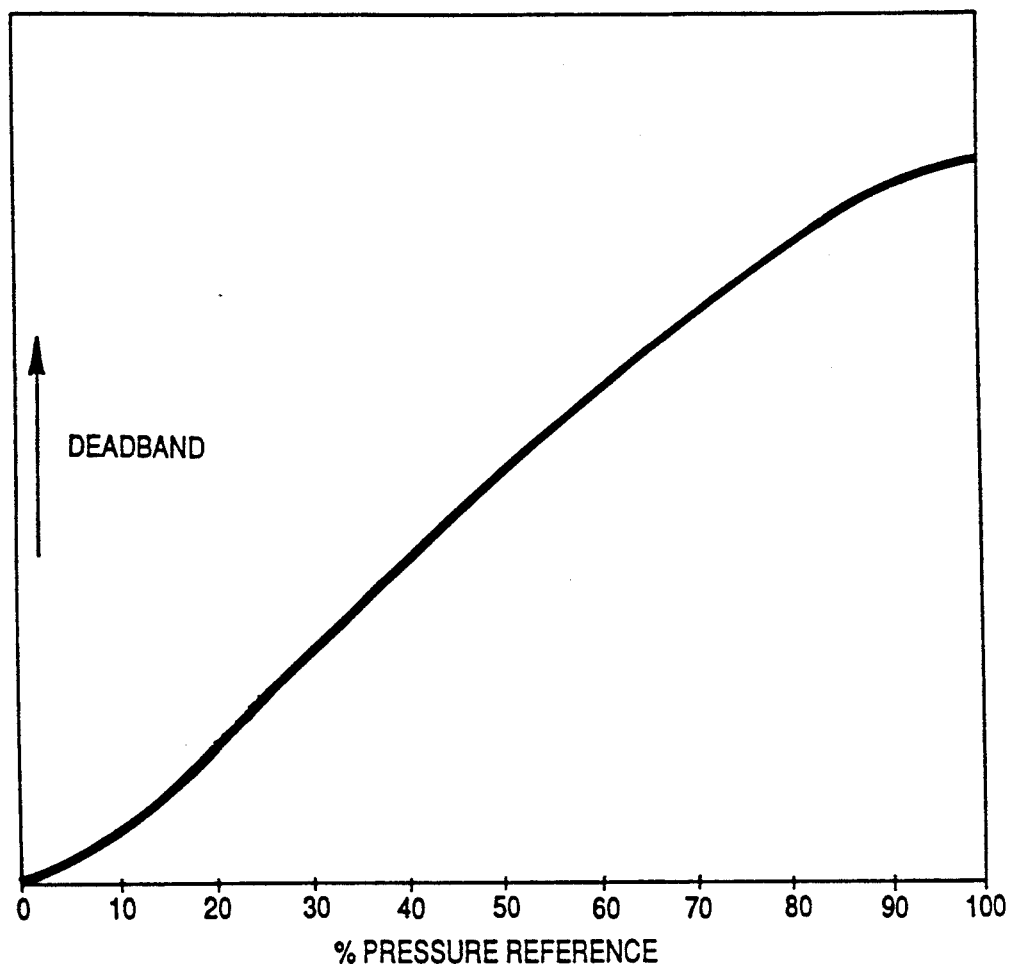
FIG. 5 is a graph of the change in deadband versus the percent setting of the pressure reference of the present invention.
Figure 6:
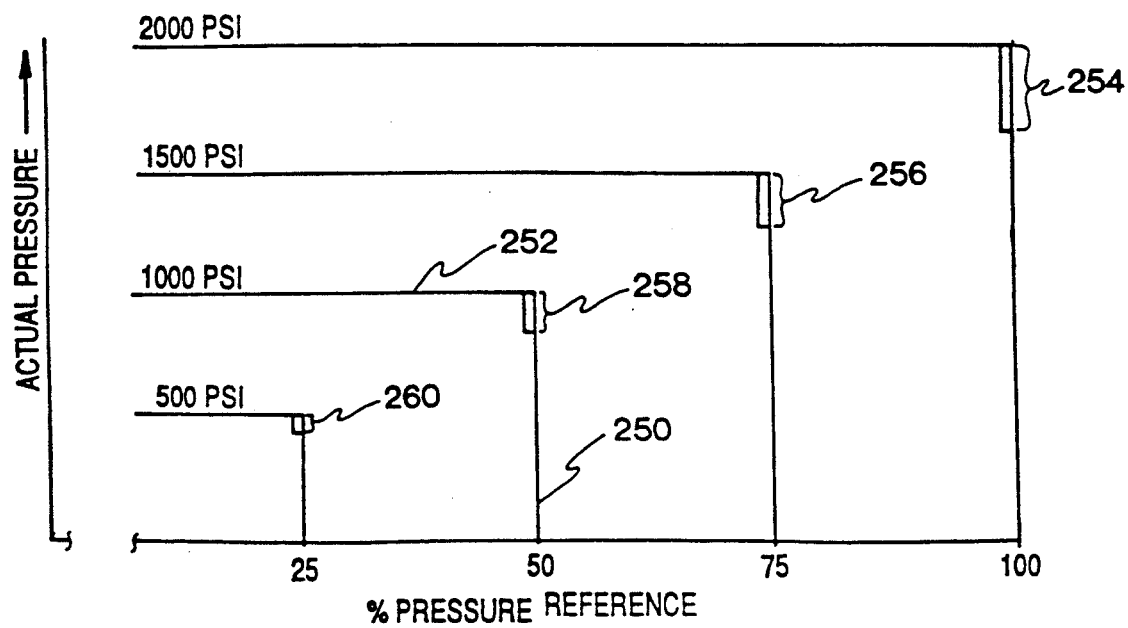
FIG. 6 is a bar chart illustrating the change in deadband with respect to the setting of the pressure reference of the present invention.

Referring now also to FIGS. 5 and 6, it may be seen that the control 22 provides for deadband increases with increasing pressure reference. For example, at 100% reference, corresponding to a 2000 PSI set point (which preferably corresponds to 5 volts on $P_{REF}$ line 72), the deadband 254 is approximately 428 psi, while at 1500 PSI set point the deadband 256 is approximately 256 psi; at 1000 PSI set point the deadband 258 is approximately 120 psi, and at 500 PSI set point the deadband 260 is approximately 32 psi. These deadband values are calculated values; it is to be understood that in practice the system will ordinarily have substantial pressure variations or pulsations due to the nature of the instantaneous pressure output of a piston type pump such as is used in this system 10.

It is to be further understood that the pressure reference and deadband control 62 inserts a deadband and adjusts the deadband in proportion to the pressure reference setting such that at high settings a larger deadband is inserted into the control loop and at lower settings of the pressure reference a smaller deadband is inserted into the control loop.

It has been found that the useful lower end of the operating range of this invention is approximately 25% pressure reference. While an operating range of 500 to 2000 psi has been found adequate for presently known applications of this invention, it is to be understood that the high and low end points of the range and the deadband values may be varied in the practice of this invention.

The invention is not to be taken as limited to all of the details thereof as modifications and variations thereof may be made without departing from the spirit or scope of the invention.

What is claimed is:

1. Pressure control loop apparatus for controlling the operation of a drive train of portable paint spraying equipment having a piston paint pump, the pressure control loop apparatus comprising:
   a) a paint pressure transducer coupled to the output of the piston paint pump having an output pressure signal representative of the output pressure of the piston paint pump;
   b) a pressure reference means having a manually adjustable control for adjusting a desired pressure signal;
   c) comparator means for comparing the desired pressure signal and the output pressure signal and for providing a signal to turn the drive train ON when the output pressure signal is less than the desired pressure signal; and
   d) a pressure deadband control means for inserting a pressure deadband in the pressure control loop wherein the deadband extends from an upper level above which the drive train is turned OFF and a lower level below which the drive train is turned ON and wherein the pressure deadband control means further includes means for shifting the desired pressure signal from a higher level to a lower level when the drive train is turned OFF and from the lower level to the higher level when the drive train is turned ON and wherein the means for shifting the desired pressure signal comprises a voltage level shifter connected to shift a voltage supplied by the manually adjustable control as the desired pressure signal.

2. The pressure control loop apparatus of claim 1 wherein the pressure deadband increases with increases in the manually adjusted setting of the desired pressure signal.

3. The pressure control loop apparatus of claim 1 further comprising:
   e) a scaling amplifier connected to the paint pressure transducer for scaling the output pressure signal and wherein the comparator means compares the desired pressure signal with the output pressure signal after it has been scaled by the scaling amplifier.

4. The pressure control loop apparatus of claim 3 further comprising maximum pressure means for limiting the maximum pressure at which the control loop operates.

5. The pressure control loop apparatus of claim 4 wherein the maximum pressure means comprises means for adjusting the gain of the scaling amplifier.

6. Pressure control loop apparatus for controlling the operation of an electromagnetic clutch in a drive train of portable paint spraying equipment having a piston paint pump, the pressure control loop apparatus comprising:

a) a paint pressure transducer coupled to the output of the piston paint pump having an output pressure signal representative of the output pressure of the piston paint pump;
  b) a pressure reference means having a manually adjustable control for adjusting a desired pressure signal;
  c) comparator means for comparing the desired pressure signal and the output pressure signal and for providing a signal to turn the clutch ON when the output pressure signal is less than the desired pressure signal;
  d) a pressure deadband control means for inserting a pressure deadband int he pressure control loop wherein the deadband extends in the upper level above which the clutch is turned OFF to a lower level below which the clutch is turned ON; and
  e) lock-out means for locking out the operation of the clutch upon the interruption of the output pressure signal from the comparator means.

* * * * *

UNITED STATES PATENT AND TRADEMARK OFFICE
CERTIFICATE OF CORRECTION

PATENT NO. : 5,282,722
DATED : February 1, 1994
INVENTOR(S) : James M. Beatty It is certified that error appears in the above-identified patent and that said Letters Patent is hereby corrected as shown below:

In column 8, Claim 6(d), line 12, change "int he" to --in the--.

Signed and Sealed this

Fourteenth Day of June, 1994

Attest:

BRUCE LEHMAN

*Attesting Officer*    *Commissioner of Patents and Trademarks*